United States Patent [19]

Ampulski et al.

[11] Patent Number: 5,897,745
[45] Date of Patent: Apr. 27, 1999

[54] METHOD OF WET PRESSING TISSUE PAPER

[75] Inventors: Robert Stanley Ampulski, Fairfield; Ward William Ostendorf, West Chester; Paul Dennis Trokhan, Cincinnati, all of Ohio

[73] Assignee: The Procter & Gamble Company, Cincinnati, Ohio

[21] Appl. No.: 08/870,213

[22] Filed: Jun. 6, 1997

Related U.S. Application Data

[63] Continuation of application No. 08/461,832, Jun. 5, 1995, Pat. No. 5,837,103, which is a continuation of application No. 08/268,154, Jun. 29, 1994, abandoned.

[51] Int. Cl.⁶ ............................................. D21F 17/00
[52] U.S. Cl. ........................ 162/109; 162/111; 162/113; 162/117; 162/205
[58] Field of Search ................................ 162/109, 113, 162/117, 358.1, 358.2, 358.3, 358.4, 361, 362, 900, 901, 902, 205

[56] References Cited

U.S. PATENT DOCUMENTS

| | | | |
|---|---|---|---|
| 3,014,832 | 12/1961 | Donnelly | 162/111 |
| 3,230,136 | 1/1966 | Krake | 162/111 |
| 3,301,746 | 1/1967 | Sanford et al. | 162/113 |
| 3,303,576 | 2/1967 | Sisson | 34/115 |
| 3,537,954 | 11/1970 | Justus | 162/305 |
| 3,629,056 | 12/1971 | Forrest | 162/305 |
| 3,824,152 | 7/1974 | Nevalainen | 162/301 |
| 3,840,429 | 10/1974 | Busker | 162/205 |
| 3,905,863 | 9/1975 | Ayers | 162/113 |
| 3,974,026 | 8/1976 | Emson et al. | 162/358 |
| 3,981,084 | 9/1976 | Sobota | 34/123 |
| 4,139,410 | 2/1979 | Tapio et al. | 162/206 |
| 4,144,124 | 3/1979 | Turunen et al. | 162/290 |
| 4,191,609 | 3/1980 | Trokhan | 162/113 |
| 4,196,045 | 4/1980 | Ogden | 162/117 |
| 4,201,624 | 5/1980 | Mohr et al. | 162/205 |
| 4,206,258 | 6/1980 | Balcar | 162/900 |
| 4,229,253 | 10/1980 | Cronin | 162/358 |
| 4,239,065 | 12/1980 | Trokhan | 139/383 |
| 4,287,021 | 9/1981 | Justus et al. | 162/358 |
| 5,232,768 | 8/1993 | Eklund et al. | 162/900 |
| 5,427,653 | 6/1995 | Andersson et al. | 162/901 |

FOREIGN PATENT DOCUMENTS 985114  3/1965  United Kingdom.

*Primary Examiner*—Peter Chin
*Attorney, Agent, or Firm*—Jay A. Krebs; Larry L. Huston; Gerry S. Gressel

[57] ABSTRACT

The present invention provides method for making a wet pressed paper web. An embryonic web of papermaking fibers is formed on a foraminous forming member, and transferred to an imprinting member to deflect a portion of the papermaking fibers in the embryonic web into deflection conduits in the imprinting member. The web, the imprinting member, and two felt layers, are then pressed in a compression nip with a foraminous backing member to mold and dewater the web.

6 Claims, 9 Drawing Sheets

METHOD OF WET PRESSING TISSUE PAPER

This application is a continuation of application Ser. No. 08/461,832 filed Jun. 5, 1995, now U.S. Pat. No. 56,837,103, which is a continuation of application Ser. No. 08/268,154 filed Jun. 29, 1994, now abandoned.

FIELD OF THE INVENTION

The present invention is related to papermaking, and more particularly, to a method for making a wet pressed paper web by wet pressing the paper web in a press nip.

BACKGROUND OF THE INVENTION

Disposable products such as facial tissue, sanitary tissue, paper towels, and the like are typically made from one or more webs of paper. If the products are to perform their intended tasks, the paper webs from which they are formed must exhibit certain physical characteristics. Among the more important of these characteristics are strength, softness, and absorbency. Strength is the ability of a paper web to retain its physical integrity during use. Softness is the pleasing tactile sensation the user perceives as the user crumples the paper in his or her hand and contacts various portions of his or her anatomy with the paper web. Softness generally increases as the paper web stiffness decreases. Absorbency is the characteristic of the paper web which allows it to take up and retain fluids. Typically, the softness and/or absorbency of a paper web is increased at the expense of the strength of the paper web. Accordingly, papermaking methods have been developed in an attempt to provide soft and absorbent paper webs having desirable strength characteristics.

U.S. Pat. No. 3,301,746 issued to Sanford et al. discloses a paper web which is thermally pre-dried with a through air-drying system. Portions of the web are then impacted with a fabric knuckle pattern at the dryer drum. While the process of Sanford et al. is directed to providing improved softness and absorbency without sacrificing tensile strength, water removal using the through-air dryers of Sanford et al. is very energy intensive, and therefore expensive. U.S. Pat. No. 3,537,954 issued to Justus discloses a web formed between an upper fabric and a lower forming wire. A pattern is imparted to the web at a nip where the web is sandwiched between the fabric and a relatively soft and resilient papermaking felt. U.S. Pat. No. 4,309,246 issued to Hulit et al. discloses delivering an uncompacted wet web to an open mesh imprinting fabric formed of woven elements, and pressing the web between a papermaker's felt and the imprinting fabric in a first press nip. The web is then carried by the imprinting fabric from the first press nip to a second press nip at a drying drum. U.S. Pat. No. 4,144,124 issued to Turunen et al. discloses a paper machine having a twin-wire former having a pair of endless fabrics, which can be felts. One of the endless fabrics carries a paper web to a press section. The press section can include the endless fabric which carries the paper web to the press section, an additional endless fabric which can be a felt, and a wire for patterning the web.

PCT Publication WO95/17548 having a U.S. priority date of Dec. 20, 1993 and published Jun. 29, 1995 in the name of Ampuliski et al.; and PCT Publication WO 96/00813 having a U.S. priority date of Jun. 29, 1994 and published Jan. 11, 1996 in the name of Trokhan et al. disclose papermaking methods employing dewatering felt layers.

Embossing can be used to pattern a web. However, embossing the web after the web is dried can disrupt fiber bonds, and ultimately decrease the strength of the web.

While suitable methods of making paper webs are disclosed in the art, paper scientists continue to search for even better methods for making patterned paper structures economically and with increased strength, without sacrificing softness and absorbency.

Accordingly, one object of the present invention is to provide a method for dewatering and molding a tissue paper web.

Another object of the present invention is to provide a nonembossed, patterned tissue paper web.

Another object of the present invention is to provide a method of enhancing water removal from a web during pressing of the web.

Another object of the present invention is to press a web and an imprinting member between felt layers in order to pattern the web and enhance water removal from the web.

SUMMARY OF THE INVENTION

The present invention provides a method for molding and dewatering a paper web to provide a nonembossed, patterned tissue paper web. The method comprises forming an embryonic web of papermaking fibers on a forming member, the web having a first face and a second face. The web is then transferred from the foraminous forming member to an imprinting member having a web imprinting surface. The web is deflected on the imprinting member to form a non-monoplanar web of papermaking fibers.

The web, the imprinting member, two felt layers, and a foraminous backing member are carried into a compression nip. One of the felt layers is positioned adjacent the web, one of the felt layers is postioned adjacent the imprinting member, and the foraminous backing member is positioned adjacent one of the felt layers.

In one embodiment, the imprinting member carries the non-monoplanar web to a compression nip. The web, the imprinting member, and a first dewatering felt layer are positioned intermediate a second dewatering felt layer and a foraminous backing member in the compression nip. The first dewatering felt is positioned intermediate the web and the foraminous backing member, wherein a surface of the first felt layer is positioned adjacent a first face of the web. The web imprinting member is positioned intermediate the web and the second dewatering felt layer, with the web imprinting surface of the imprinting member being positioned adjacent the second face of the web.

The method includes the step of pressing the intermediate web in the nip to further deflect the papermaking fibers into a deflection conduit portion of the web imprinting member. Water pressed from the web and received by a first surface of the first dewatering felt layer can exit the opposite face of the first dewatering felt layer through the foraminous backing member.

The foraminous backing member provides a flow path for receiving water passing through the first dewatering felt layer, thereby permitting the first dewatering felt layer to receive additional water pressed from the web. The foraminous backing member preferably has a void volume of at least about 100 grams per square meter for receiving water passing through the first dewatering felt from the web. The foraminous backing member preferably has a void volume of at least about 200 grams per square meter, and even more preferably between about 400 and about 600 grams per square meter.

The foraminous backing member can also have a compressibility of less than about 50 percent so that the void volume of the foraminous backing member remains open while the foraminous backing member is passing through the nip. Preferably, the surface of the foraminous backing member which is positioned adjacent to the first dewatering felt layer has an open area of at least about 20 percent to receive water from the first dewatering felt as the web and first dewatering felt layer are pressed in the nip.

The foraminous backing member can be formed from woven filaments, and can be in the form a continuous belt. In another embodiment, the foraminous backing member can comprise a patterned resin layer.

In one embodiment, the foraminous backing member comprises a patterned resin layer joined to a dewatering felt layer. For instance, the patterned resin layer can be joined to the first dewatering felt layer.

The patterned resin layer can have an open area of at least about 20 percent to provide sufficient flow area from the first felt layer. The patterned resin layer preferably has an open area less than or equal to about 80 percent to prevent compression of the resin layer, which would result in reduction of the void volume for receiving water from the first felt layer.

The first felt layer can have a first sheet side in contact with the web and an oppositiely facing second side. The first felt layer can comprise a nonwoven batt of fibers joined to a woven reinforcing element. The patterned resin layer is joined to the second side of the first felt layer. The basis weight of the batt on the first sheet side can be greater than the basis weight of the batt on the second side of the first felt layer. The fiber denier of the batt on the first sheet side can be finer than the fiber denier of the batt on the second side. In one embodiment, substantially all the batt is applied to the sheet side (side contacting the web) of the first felt layer.

BRIEF DESCRIPTION OF THE DRAWINGS

While the specification concludes with claims particularly pointing out and distinctly claiming the present invention, the invention will be better understood from the following description taken in conjunction with the accompanying drawings in which:

DETAILED DESCRIPTION OF THE INVENTION

Figure 1:
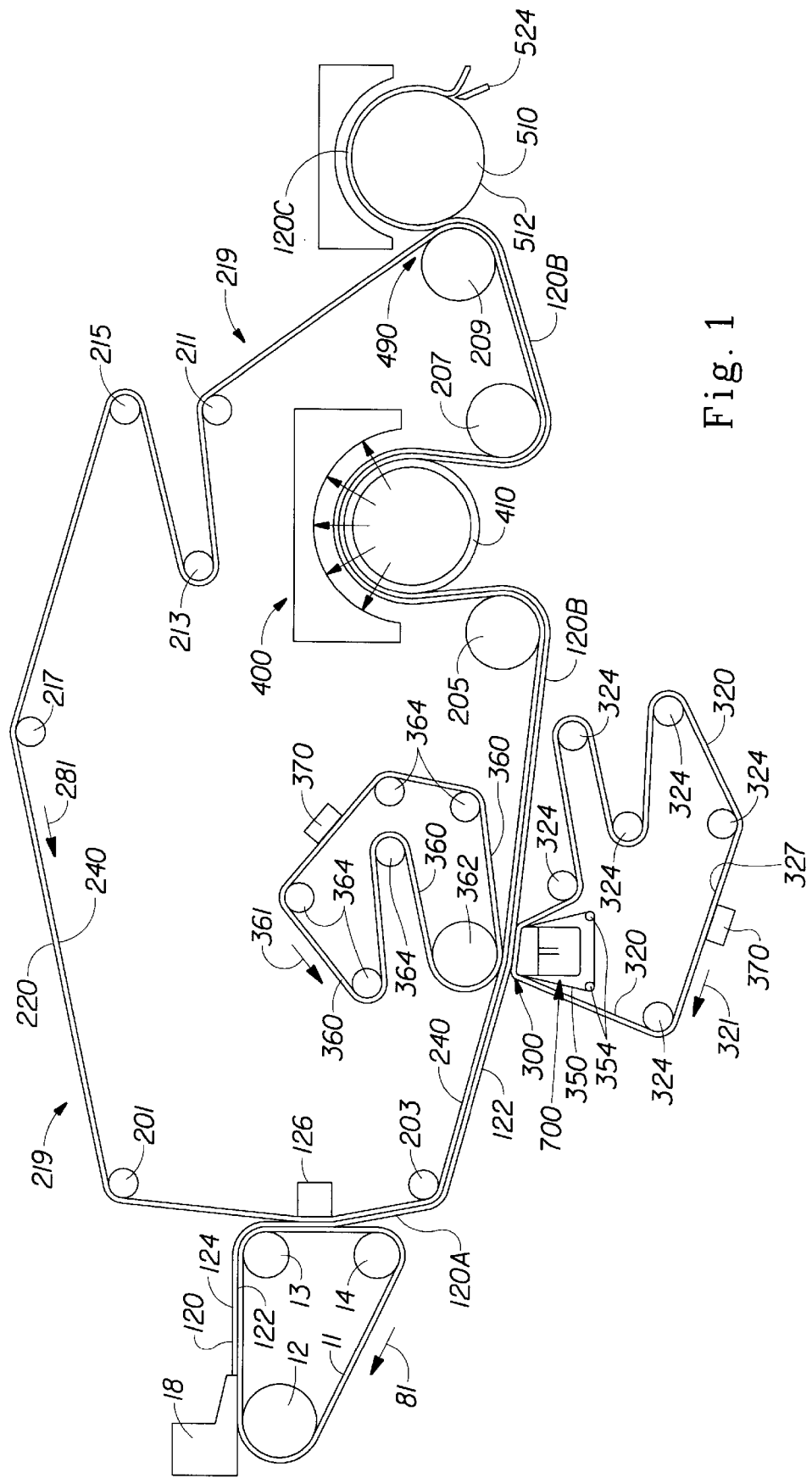
FIG. 1 is a schematic representation of one embodiment of a continuous papermaking machine illustrating transferring a paper web from a foraminous forming member to a foraminous imprinting member, carrying the paper web on the foraminous imprinting member to a compression nip, and pressing the web carried on the foraminous imprinting member in the compression nip.

FIG. 1 illustrates one embodiment of a continuous papermaking machine which can be used in practicing the present invention. The process of the present invention comprises a number of steps or operations which occur in sequence. While the process of the present invention is preferably carried out in a continuous fashion, it will be understood that the present invention can comprise a batch operation, such as a handsheet making process. A preferred sequence of steps will be described, with the understanding that the scope of the present invention is determined with reference to the appended claims.

According to one embodiment of the present invention, an embryonic web 120 of papermaking fibers is formed from an aqueous dispersion of papermaking fibers on a foraminous forming member 11. The embryonic web 120 is then transferred, preferably by vacuum transfer, to a foraminous imprinting member 219 having a first web contacting face 220 comprising a web imprinting surface and a deflection conduit portion. A portion of the papermaking fibers in the embryonic web 120 are deflected into the deflection conduit portion of the foraminous imprinting member 219 without densifying the web, thereby forming a non-monoplanar intermediate web 120A.

The intermediate web 120A is carried on the foraminous imprinting member 219 from the foraminous forming member 11 to a compression nip 300. The nip 300 can have a machine direction length of at least about 3.0 inches, and can comprise opposed convex and concave compression surfaces, with the convex compression surface being provided by a press roll 362 and the opposed concave compression surface being provided by a shoe press assembly 700. Alternatively, the nip 300 can be formed between two press rolls.

Figure 5:
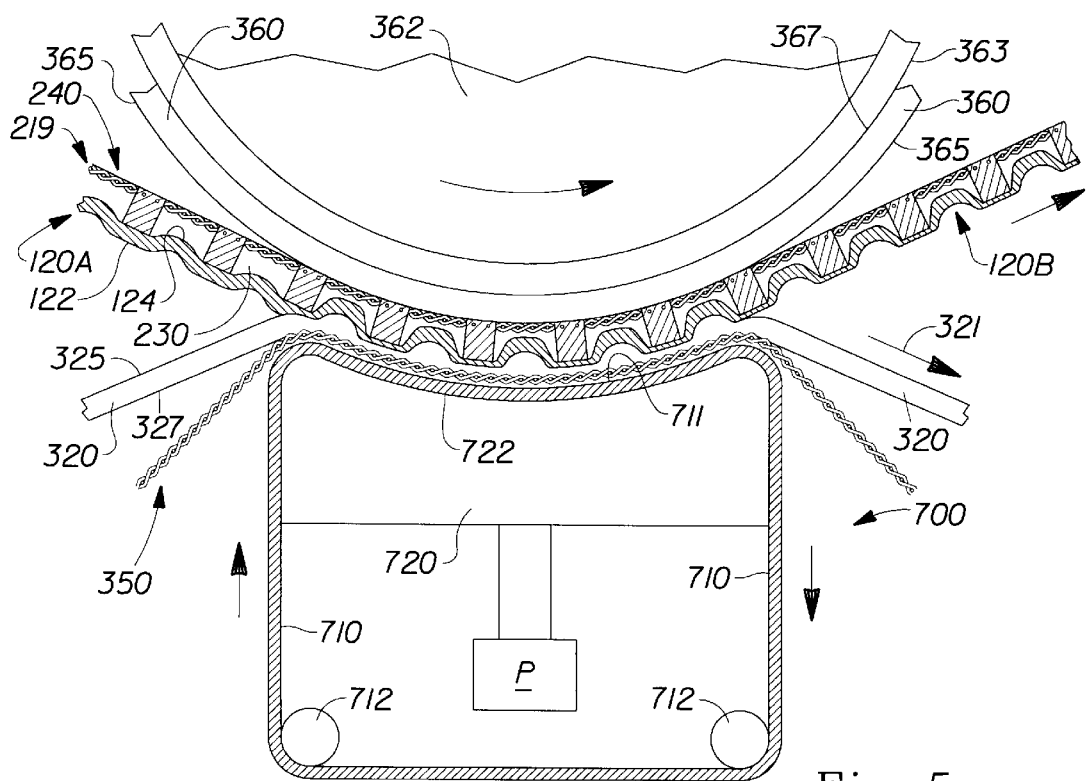
FIG. 5 is an enlarged schematic illustration of a compression nip showing a first dewatering felt layer, a web, and a web imprinting member positioned intermediate a second dewatering felt layer and a foraminous backing member in the compression nip, the foraminous backing member being in the form of fabric of woven filaments.

The web 120A is carried into the nip 300 supported on the imprinting member 219. Referring to FIGS. 1 and 5, a first dewatering felt layer 320, the web 120A, and the web imprinting member 219 are positioned intermediate a second dewatering felt layer 360 and a foraminous backing member 350 in the nip 300. In FIG. 5, the foraminous backing member 350 is in the form of a fabric of woven filaments.

The first dewatering felt layer 320 has a first surface 325 positioned adjacent the first face 122 of the intermediate web 120A in the nip 300. The web contacting face 220 of web imprinting member 219 is positioned adjacent the second face 124 of the intermediate web 120A in the nip 300. The first dewatering felt layer 320 is positioned intermediate the web 120A and the foraminous backing member 350 in the nip 300. As shown in FIG. 5, the second surface 327 of the first dewatering felt layer 320 is positioned adjacent the foraminous backing member 350.

Water pressed from the web 120A and received by the first dewatering felt layer 320 at the first surface 325 can subsequently exit the first dewatering felt layer's second surface 327 and enter the openings in the foraminous backing member 350. The openings in the foraminous backing member 350 provide a resevoir for the water received by the foraminous backing member 350 from the first dewatering felt layer 320. As water leaves the second surface 327 and enters the openings in the foraminous backing member 350, additional water can be received from the web 120A by the first dewatering felt 320. Accordingly, the addition of the foraminous backing member 350 improves the web dewatering capability of the press nip 300 without an additional vacuum apparatus associated with the press nip 300.

The intermediate web 120A is pressed between the imprinting member 219 and the first felt layer 320 in the compression nip 300 to further deflect a portion of the papermaking fibers into the deflection conduit portion of the imprinting member 219, and to density a portion of the intermediate web 120A associated with the web imprinting surface of the web imprinting member. Water pressed from the web 120A exits the first face 122 of the web 120A, as described above. Additionally, water pressed from the web 120A can also exit the second face 124 of the web, and pass through openings in the imprinting member 219 to be received by the second dewatering felt layer 360. Accordingly, the web 120A is effectively dewatered by removing water from both sides of the web, thereby forming a molded web 120B which is relatively dryer than the intermediate web 120A.

At the exit of the compression nip 300, the first felt layer 320 can be separated from the molded web 120B, and the second felt layer 360 can be separated from the imprinting member 219, as shown in FIG. 5. Accordingly, after pressing in the nip 300, the water held in the first felt layer 320 is isolated from the web 120B, and the water held in the second felt layer 360 is isolated from the imprinting member 219. This isolation helps to prevent rewetting of the web 120B.

The molded web 120B is preferably carried from the compression nip 300 on the foraminous imprinting member 219. The molded web 120B can be pre-dried in a through air dryer 400 by directing heated air to pass first through the molded web, and then through the foraminous imprinting member 219, thereby further drying the molded web 120B. Alternatively, the dryer 400 can be omitted.

The web imprinting surface of the foraminous imprinting member 219 can then be impressed into the molded web 120B such as at a nip formed between a roll 209 and a dryer drum 510, thereby forming an imprinted web 120C. The roll 209 can be a vacuum pressure roll, or alternatively, can be a solid roll or a blind drilled roll.

Impressing the web imprinting surface into the molded web can further densify the portions of the web associated with the web imprinting surface. The imprinted web 120C can then be dried on the dryer drum 510 and creped from the dryer drum by a doctor blade 524.

Examining the process steps according to the present invention in more detail, a first step in practicing the present invention is providing an aqueous dispersion of papermaking fibers derived from wood pulp to form the embryonic web 120. The papermaking fibers utilized for the present invention will normally include fibers derived from wood pulp. Other cellulosic fibrous pulp fibers, such as cotton linters, bagasse, etc., can be utilized and are intended to be within the scope of this invention. Synthetic fibers, such as rayon, polyethylene and polypropylene fibers, may also be utilized in combination with natural cellulosic fibers. One exemplary polyethylene fiber which may be utilized is Pulpex™, available from Hercules, Inc. (Wilmington, Del.). Applicable wood pulps include chemical pulps, such as Kraft, sulfite, and sulfate pulps, as well as mechanical pulps including, for example, groundwood, thermomechanical pulp and chemically modified thermomechanical pulp. Pulps derived from both deciduous trees (hereinafter, also referred to as "hardwood") and coniferous trees (hereinafter, also referred to as "softwood"), as well as combinations of hardwoods and softwoods may be utilized. Also applicable to the present invention are fibers derived from recycled paper, which may contain any or all of the above categories as well as other non-fibrous materials such as fillers and adhesives used to facilitate the original papermaking.

In addition to papermaking fibers, other components or materials may be added to the papermaking furnish. The types of additives desirable will be dependent upon the particular end use of the tissue sheet contemplated. For example, in products such as toilet paper, paper towels, facial tissues and other similar products, high wet strength is a desirable attribute. Thus, it is often desirable to add to the papermaking furnish chemical substances known in the art as "wet strength" resins.

A general dissertation on the types of wet strength resins utilized in the paper art can be found in TAPPI monograph series No. 29, Wet Strength in Paper and Paperboard, Technical Association of the Pulp and Paper Industry (New York, 1965). The most useful wet strength resins have generally been cationic in character. Polyamide-epichlorohydrin resins are cationic wet strength resins which have been found to be of particular utility. Suitable types of such resins are described in U.S. Pat. No. 3,700,623, issued on Oct. 24, 1972, and U.S. Pat. No. 3,772,076, issued on Nov. 13, 1973, both issued to Keim and both being hereby incorporated by reference. One commercial source of a useful polyamideepichlorohydrin resins is Hercules, Inc. of Wilmington, Del., which markets such resin under the mark Kymene™ 557H.

Polyacrylamide resins have also been found to be of utility as wet strength resins. These resins are described in U.S. Pat. No. 3,556,932, issued on Jan. 19, 1971, to Coscia, et al. and U.S. Pat. No. 3,556,933, issued on Jan. 19, 1971, to Williams et al., both patents being incorporated herein by reference. One commercial source of polyacrylamide resins is American Cyanamid Co. of Stanford, Conn., which markets one such resin under the mark Parez™ 631 NC.

Still other water-soluble cationic resins finding utility in this invention are urea formaldehyde and melamine formaldehyde resins. The more common functional groups of these polyfunctional resins are nitrogen containing groups such as amino groups and methylol groups attached to nitrogen. Polyethylenimine type resins may also find utility in the present invention. In addition, temporary wet strength resins such as Caldas 10 (manufactured by Japan Carlit) and CoBond 1000 (manufactured by National Starch and Chemical Company) may be used in the present invention. It is to be understood that the addition of chemical compounds such as the wet strength and temporary wet strength resins discussed above to the pulp furnish is optional and is not necessary for the practice of the present development.

The embryonic web 120 is preferably prepared from an aqueous dispersion of the papermaking fibers, though dispersions of the fibers in liquids other than water can be used. The fibers are dispersed in water to form an aqueous dispersion having a consistency of from about 0.1 to about 0.3 percent. The percent consistency of a dispersion, slurry, web, or other system is defined as 100 times the quotient obtained when the weight of dry fiber in the system under discussion is divided by the total weight of the system. Fiber weight is always expressed on the basis of bone dry fibers.

A second step in the practice of the present invention is forming the embryonic web 120 of papermaking fibers. Referring to FIG. 1, an aqueous dispersion of papermaking fibers is provided to a headbox 18 which can be of any convenient design. From the headbox 18 the aqueous dispersion of papermaking fibers is delivered to a foraminous forming member 11 to form an embryonic web 120. The forming member 11 can comprise a continuous Fourdrinier wire. Alternatively, the foraminous forming member 11 can comprise a plurality of polymeric protuberances joined to a continuous reinforcing structure to provide an embryonic web 120 having two or more distinct basis weight regions, such as is disclosed in U.S. Pat. No. 5,245,025 issued Sep. 14, 1993 to Trokhan et al; and U.S. Pat. No. 5,527,428 issued Jun. 18, 1996 to Trokhan et al., which patents are incorporated herein by reference. While a single forming member 11 is shown in FIG. 1, single or double wire forming apparatus, crescent forming apparatus, as well as other forming wire configurations, such as S or C wrap configurations can be used.

Additionally, two or more layers of fiber furnish comprising different characteristics, such as different fiber types, may be delivered to the forming member to provide a layered embryonic web. U.S. Pat. No. 4,300,981 to Carstens and U.S. Pat. No. 3,994,771 to Morgan et al. are incorporated herein by reference for the purpose of disclosing fiber layering methods.

The forming member 11 is supported by a breast roll 12 and plurality of return rolls, of which only two return rolls 13 and 14 are shown in FIG. 1. The forming member 11 is driven in the direction indicated by the arrow 81 by a drive means not shown. The embryonic web 120 is formed from the aqueous dispersion of papermaking fibers by depositing the dispersion onto the foraminous forming member 11 and removing a portion of the aqueous dispersing medium. The embryonic web 120 has a first web face 122 contacting the foraminous member 11 and a second oppositely facing web face 124.

The embryonic web 120 can be formed in a continuous papermaking process, as shown in FIG. 1, or alternatively, a batch process, such as a handsheet making process can be used. After the aqueous dispersion of papermaking fibers is deposited onto the foraminous forming member 11, the embryonic web 120 is formed by removal of a portion of the aqueous dispersing medium by techniques well known to those skilled in the art. Vacuum boxes, forming boards, hydrofoils, and the like are useful in effecting water removal from the aqueous dispersion on the foraminous forming member 11. The embryonic web 120 travels with the forming member 11 about the return roll 13 and is brought into the proximity of a foraminous imprinting member 219.

The foraminous imprinting member 219 has a first web contacting face 220 and a second face 240. In the embodiment shown in FIGS. 2 and 3, the web contacting face 220 has a web imprinting surface 222 and a deflection conduit portion 230. The deflection conduit portion 230 forms at least a portion of a continuous passageway extending from the first face 220 to the second face 240 for carrying water through the foraminous imprinting member 219. Accordingly, when water is removed from the web of papermaking fibers in the direction of the foraminous imprinting member 219, the water can be disposed of without having to again contact the web of papermaking fibers. The foraminous imprinting member 219 can comprise an endless belt, as shown in FIG. 1, and can be supported by a plurality of rolls 201–217.

The foraminous imprinting member 219 is driven in the direction 281 (corresponding to the machine direction) shown in FIG. 1 by a drive means (not shown). The first web contacting face 220 of the foraminous imprinting member 219 can be sprayed with an emulsion comprising about 90 percent by weight water, about 8 percent petroleum oil, about 1 percent cetyl alcohol, and about 1 percent of a surfactant such as Adogen TA-100. Such an emulsion facilitates transfer of the web from the imprinting member 219 to the drying drum 510. Of course, it will be understood that the foraminous imprinting member 219 need not comprise an endless belt if used in making handsheets in a batch process.

Figure 2:
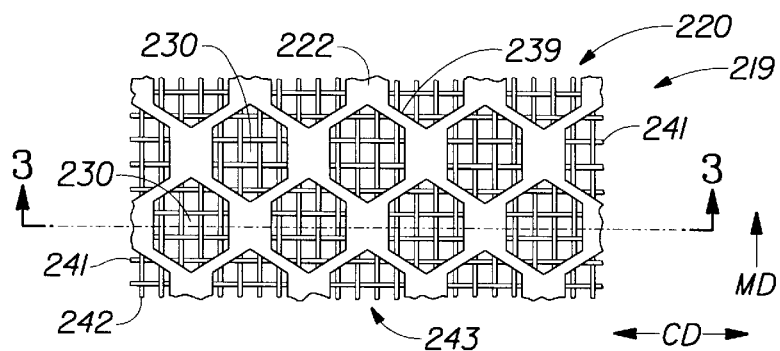
FIG. 2 is a schematic illustration of a plan view of a foraminous imprinting member having a first web contacting face comprising a macroscopically monoplanar, patterned continuous network web imprinting surface defining within the foraminous imprinting member a plurality of discrete, isolated, non connecting deflection conduits.
Figure 3:
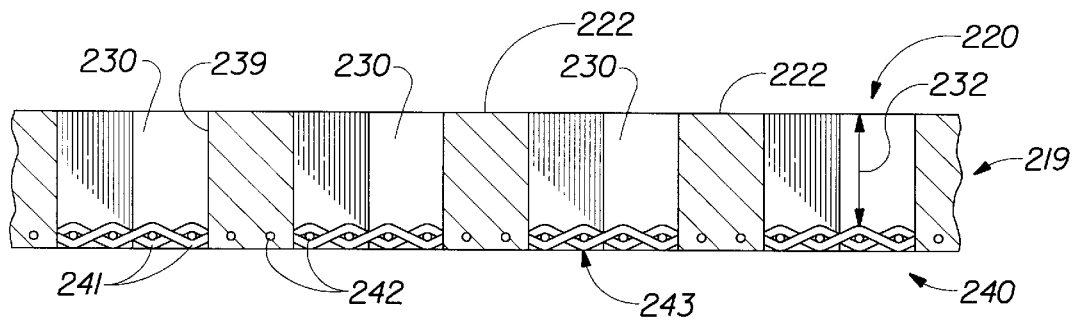
FIG. 3 is a schematic cross-sectional view of a portion of the foraminous imprinting member shown in FIG. 2 as taken along line 3—3.

In the embodiment shown in FIGS. 2 and 3, the first web contacting face 220 of the foraminous imprinting member 219 comprises a patterned resin layer having a macroscopically monoplanar, patterned, continuous network web imprinting surface 222. The continuous network web imprinting surface 222 defines within the foraminous resin layer of the imprinting member 219 a plurality of discrete, isolated, non-connecting deflection conduits 230. The deflection conduits 230 have openings 239 which can be random in shape and in distribution, but which are preferably of uniform shape and distributed in a repeating, preselected pattern on the first web contacting face 220. Such a patterned resin layer having a continuous network web imprinting surface 222 and discrete deflection conduits 230 are useful for forming a paper structure having a continuous, relatively high density network region and a plurality of relatively low density domes dispersed throughout the continuous, relatively high density network region, as disclosed in U.S. Pat. No. 4,528,239, issued Jul. 9, 1985 to Trokhan, which patent is incorporated herein by reference.

Suitable shapes for the openings 239 include, but are not limited to, circles, ovals, and polygons, with hexagonal shaped openings 239 shown in FIG. 2. The openings 239 can be regularly and evenly spaced in aligned ranks and files. Alternatively, the openings 239 can be bilaterally staggered in the machine direction (MD) and cross-machine direction (CD), as shown in FIG. 2, where the machine direction refers to that direction which is parallel to the flow of the web through the equipment, and the cross machine direction is perpendicular to the machine direction. A foraminous imprinting member 219 having a continuous network web imprinting surface 222 and discrete isolated deflection conduits 230 can be manufactured according to the teachings of the following U.S. Patents which are incorporated herein by reference: U.S. Pat. No. 4,514,345 issued Apr. 30, 1985 to Johnson et al.; U.S. Pat. No. 4,529,480 issued Jul. 16, 1985 to Trokhan; and U.S. Pat. No. 5,098,522 issued Mar. 24, 1992 to Smurkoski et al.; and U.S. Pat. No. 5,514,523 issued May 7, 1996 to Trokhan et al.

Referring to FIGS. 2 and 3, the foraminous imprinting member 219 can include a woven reinforcement element 243 for strengthening the foraminous imprinting member 219. The reinforcement element 243 can include machine direction reinforcing strands 242 and cross machine direction reinforcing strands 241, though any convenient weave pattern can be used. The openings in the woven reinforcement element 243 formed by the interstices between the strands 241 and 242 are smaller than the size of the openings 239 of the deflection conduits 230. Together, the openings in the woven reinforcement element 243 and the openings 239 of the deflection conduits 230 provide a continuous passageway extending from the first face 220 to the second face 240 for carrying water through the foraminous imprinting member 219.

The area of the web imprinting surface 222, as a percentage of the total area of the first web contacting surface 220, should be between about 15 percent to about 65 percent, and more preferably between about 20 percent to about 50 percent. The deflection conduits 230 can have a depth 232 (FIG. 3) which is between about 0.1 mm and about 1.0 mm.

In an alternative embodiment, the foraminous imprinting member 219 can comprise a fabric belt formed of woven filaments. The web imprinting surface 222 can be formed by discrete knuckles formed at the cross-over points of the woven filaments. Suitable woven filament fabric belts for use as the foraminous imprinting member 219 are disclosed in U.S. Pat. No. 3,301,746 issued Jan. 31, 1967 to Sanford et al., U.S. Pat. No. 3,905,863 issued Sep. 16, 1975 to Ayers, U.S. Pat. 4,191,609 issued Mar. 4, 1980 to Trokhan, and U.S. Pat. No. 4,239,065 issued Dec. 16, 1980 to Trokhan, which patents are incorporated herein by reference.

In another alternative embodiment, the foraminous imprinting member 219 can have a first web contacting face 220 comprising a continuous patterned deflection conduit encompassing a plurality of discrete, isolated web imprinting surfaces. Such a foraminous imprinting member 219 can be used to form a molded web having a continuous, relatively low density network region, and a plurality of discrete, relatively high density regions dispersed throughout the continuous, relatively low density network. Such a foraminous imprinting member is shown in U.S. Pat. No. 4,514,345 issued Apr. 30, 1985 to Johnson et al., which patent is incorporated herein by reference. Alternatively, the foraminous imprinting member can have a first web contacting face 220 comprising a semicontinuous web imprinting surface, such as is disclosed in U.S. patent application Ser. No. 08/384,199 filed Feb. 6, 1995 in the name of Ayers et al.

A third step in the practice of the present invention comprises transferring the embryonic web 120 from the foraminous forming member 11 to the foraminous imprinting member 219, to position the second web face 124 on the first web contacting face 220 of the foraminous imprinting member 219.

A fourth step in the practice of the present invention comprises deflecting a portion of the papermaking fibers in the embryonic web 120 into the deflection conduit portion 230 of web contacting face 220, and removing water from the embryonic web 120 through the deflection conduit portion 230 to form an intermediate web 120A of the papermaking fibers. The embryonic web 120 can have a consistency of between about 4 and about 20 percent at the point of transfer to facilitate deflection of the papermaking fibers into the deflection conduit portion 230.

The steps of transferring the embryonic web 120 to the imprinting member 219 and deflecting a portion of the papermaking fibers in the web 120 into the deflection conduit portion 230 can be provided, at least in part, by applying a differential fluid pressure to the embryonic web 120. For instance, the embryonic web 120 can be vacuum transferred from the forming member 11 to the imprinting member 219, such as by a vacuum box 126 shown in FIG. 1, or alternatively, by a rotary pickup vacuum roll (not shown). The pressure differential across the embryonic web 120 provided by the vacuum source (e.g., the vacuum box 126) deflects the fibers into the deflection conduit portion 230, and preferably removes water from the web through the deflection conduit portion 230 to raise the consistency of the web to between about 18 and about 30 percent. The pressure differential across the embryonic web 120 can be between about 13.5 kPa and about 77.8 kPa (between about 4 to about 23 inches of mercury). The vacuum provided by the vacuum box 126 permits transfer of the embryonic web 120 to the foraminous imprinting member 219 and deflection of the fibers into the deflection conduit portion 230 without compacting the embryonic web 120. Additional vacuum boxes can be included to further dewater the intermediate web 120A.

Referring to FIG. 5, portions of the intermediate web 120A are shown deflected into the deflection conduits 230 upstream of the compression nip 300, so that the intermediate web 120A is non-monoplanar. The intermediate web 120A is shown having a generally uniform thickness (distance between first and second web faces 122 and 124) upstream of the compression nip 300 to indicate that a portion of the intermediate web 120A has been deflected into the imprinting member 219 without locally densifying or compacting the intermediate web 120A upstream of the compression nip 300. Transfer of the embryonic web 120 and deflection of the fibers in the embryonic web into the deflection conduit portion 230 can be accomplished essentially simultaneously. Above referenced U.S. Pat. No. 4,529,480 is incorporated herein by reference for the purpose of teaching a method for transferring an embryonic web to a foraminous member and deflecting a portion of the papermaking fibers in the embryonic web into the foraminous member.

Referring to FIGS. 1 and 5, the web is transferred to be supported on the imprinting member 219 upstream of the nip 300. The imprinting member 219 has a relatively high air permeability, relatively open structure. The imprinting member 219 has an air permeability of at least about 250 scfm. Because of the relatively high air permeability, open structure of the imprinting member 219, the vacuum box 126 can effectively remove water from the web through the imprinting member 219, and little (if any) water is contained in the imprinting member 219 after transfer of the web to the imprinting member 219. As a result, re-wet of the web by water in the imprinting member 219 is minimized.

In addition, the felts 320 and 360 are separated from the web and the imprinting member 219 upstream of the nip 300. Accordingly, the felts 320 and 360 are not adjacent the web or the member 219 upstream of the nip, and the felts 320 and 360 can be relatively dry when the felts 320 and 360 enter the nip 300 in order to provide efficient drying of the web.

A fifth step in the practice of the present invention comprises pressing the wet intermediate web 120A in the compression nip 300 to form the molded web 120B. Referring to FIGS. 1 and 5, the intermediate web 120A is carried on the foraminous imprinting member 219 from the foraminous forming member 11 and through the compression nip 300 formed between the opposed compression surfaces of roll 362 and shoe press assembly 700. In order to describe the operation of the compression nip 300, the imprinting member 219, dewatering felts 320, 360, the foraminous backing member 350, and the paper web are drawn enlarged relative to the roll 362 and the press assembly 700.

The first dewatering felt 320 is shown supported in the compression nip such that the foraminous backing member 350 is positioned between the first felt 320 and the press shoe assembly 700. The first felt 320 is driven in the direction 321 around a plurality of felt support rolls 324. The shoe press assembly 700 includes a fluid impervious pressure belt 710, a pressure shoe 720, and pressure source P. The pressure shoe 720 can have a generally arcuate, concave surface 722. The pressure belt 710 travels in a continuous path over the generally concave surface 722 and the guide rolls 712. The pressure source P provides hydraulic fluid under pressure to a cavity (not shown) in the pressure shoe 720. The pressurized fluid in the cavity urges the pressure belt 710 against the felt 320, and provides the loading of the compression nip 300. Shoe press assemblies are disclosed generally in the following U.S. Patents, which are incorporated herein by reference: U.S. Pat. No. 4,559,258 to Kiuchi; U.S. Pat. No. 3,974,026 to Emson et al.; U.S. Pat. No. 4,287,021 to Justus et al.; U.S. Pat. No. 4,201,624 to Mohr et al.; U.S. Pat. No. 4,229,253 to Cronin; U.S. Pat. No. 4,561,939 to Justus; U.S. Pat. No. 5,389,205 to Pajula et al.; U.S. Pat. No. 5,178,732 to Steiner et al.; U.S. Pat. No. 5,308,450 to Braun et al.

The outer surface of the pressure belt 710 takes on a generally arcuate, concave shape as it passes over the pressure shoe 720, and provides a concave compression surface facing oppositely to the convex compression surface provided by press roll 362. This portion of the outer surface of the pressure belt 710 passing over the pressure shoe is designated 711 in FIG. 5. The outer surface of the pressure belt 710 can be smooth or grooved.

The convex compression surface provided by the press roll 362 in combination with the oppositely facing concave compression surface provided by the shoe press assembly 700 provide an arcuate compression nip having machine direction length which is at least about 3.0 inch. In one embodiment, the compression nip 300 has a machine direction length of between about 3.0 to about 20.0 inches, and more preferably between about 4.0 inches and about 10.0 inches.

The first dewatering felt layer 320 can be supported to travel around a plurality of support rolls 324, and travels through the compression nip 300 positioned between the web 120A and the foraminous backing member 350. The foraminous backing member 350 can be supported to travel around a plurality of support rolls 354 (FIG. 1) and travels through the compression nip 300 positioned between the first dewatering felt layer 320 and the belt 710. The second dewatering felt 360 can be supported to travel around a plurality of felt support rolls 364, and travels through the compression nip 300 positioned between the imprinting member 219 and the press roll 362.

A felt dewatering apparatus 370, such as a Uhle vacuum box can be associated with each of the dewatering felts 320 and 360 to remove water transferred to the dewatering felts from the intermediate web 120A.

The press roll 362 can have a generally smooth surface. Alternatively, the roll 362 can be grooved, or have a plurality of openings in flow communication with a source of vacuum for facilitating water removal from the intermediate web 120A. The roll 362 can have a rubber coating 363, such as a bonehard rubber cover, which can be smooth, grooved, or perforated. The rubber coating 363 shown in FIG. 5 provides a convex compression surface which faces oppositely to the concave compression surface 711 provided by the shoe press assembly 700.

The foraminous backing member 350 shown in FIG. 5 is in the form of a fabric of woven filaments. Such a fabric is shown schematically in plan view in FIG. 4. The foraminous backing member 350 shown in FIG. 4 includes machine direction filaments 1352 and cross-machine direction filaments 1354. The filaments 1352 and 1354 are sized and spaced relative to one another to provide openings 1356 through which water can pass.

Figure 4:
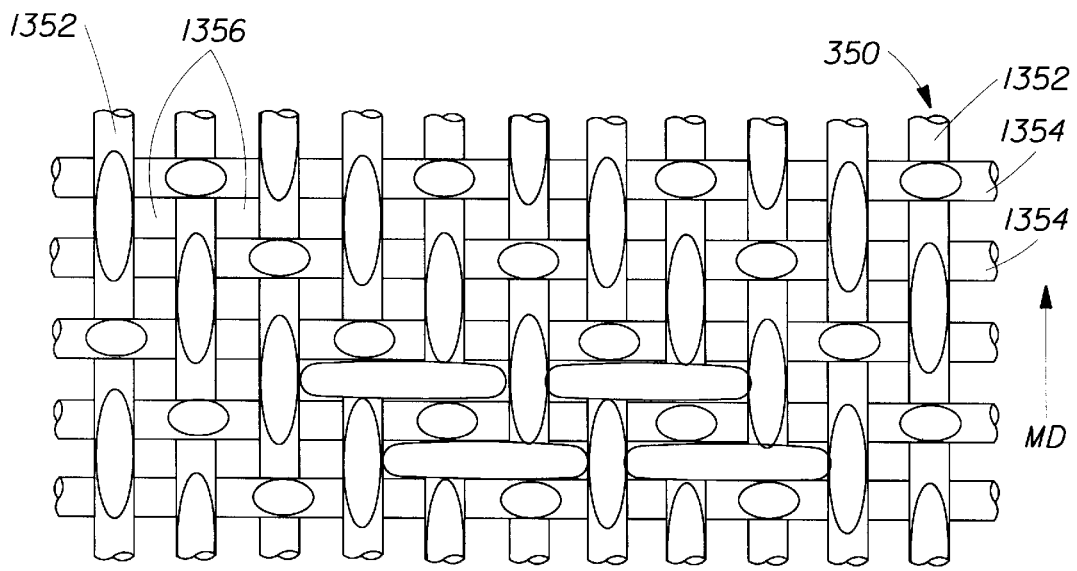
FIG. 4 is a schematic plan view illustration of a fabric of woven filaments which can be used as a foraminous backing member.

While the foraminous backing member 350 in FIG. 4 is in the form of a woven fabric of filaments, the foraminous backing member 350 can also comprise a foraminous resin layer. For instance, the foraminous backing member 350 can comprise a patterned resin layer joined to a woven reinforcing element, such as is illustrated in FIGS. 2 and 3 for use as a web imprinting member. The patterned resin layer can be continuous, discontinuous, or semicontinuous.

By way of example, a structure such as that shown in FIGS. 2 and 3 can be positioned between the first dewatering felt layer 320 and the belt 710. The surface 222 can be positioned against surface 327 of the dewatering felt 320, so that water can pass from the dewatering felt layer 320 into the conduits 230 via the openings 230 in the surface 222. Alternatively, if the second face 240 is positioned against the first dewatering felt 320, water can pass from the felt layer 320 into the conduits 230 via the openings in the reinforcing element 243.

The foraminous backing member 350 preferably has a void volume of at least about 100 grams per square meter, more preferably at least about 200 grams per square meter, and even more preferably between about 400 and about 600 grams per square meter, for receiving an effective amount of water per unit of projected surface area of foraminous backing member, as viewed in FIG. 5. The void volume is measured using the following procedure.

Void Volume

The void volume of a woven element such as the one shown in FIG. 4 is determined as follows. First, a sample of the woven element is cut to measure approximately 30 cm (length)×30 cm (width). The length, width, and thickness of the sample are then measured. The length and width can be measured with a ruler having millimeter divisions. The thickness of the sample is measured to the nearest 0.010 millimeter using a Thwing Albert Model 89-100 Thickness Tester having a 2.0 inch diameter pressure foot at a pressure of 95 grams/square inch (manufactured by the Thwing Albert Co. of Philadelphia, Pa.)

The geometric area of the element is obtained by multiplying the length by the width. The geometric volume of the element is calculated by multiplying the length by the width by the caliper. The element is then submerged in a separatory flask that is filled to the side tube with water. When the element is submerged in the flask, water will be displaced from the flask out the side tube. The displaced water is collected and weighed. The weight of the displaced water is used to calculate the volume of the displaced water, which is considered equal to the volume occupied by the filaments of the woven element. The volume of the displaced water is calculated using the nominal value of 1 gram/cubic centimeter.

The void volume of the element is obtained by subtracting the volume of water displaced from the geometric volume of the sample. The void volume is then converted to weight of water that can be contained in that volume using the nominal value of 1 gram/cubic centimeter. The water weight per unit area is determined by dividing the water weight by the geometric area of the sample. The value is normalized to grams of water per square meter of the woven element. The void volume is reported in grams of water per square meter of the sample.

Figure 11:
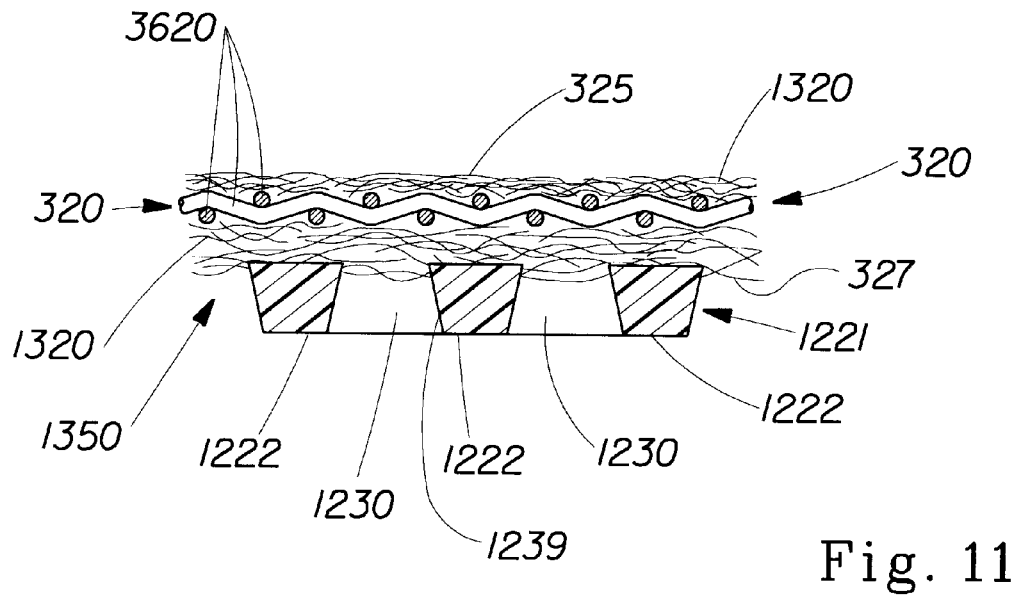
FIG. 11 is a schematic cross-sectional illustration of a foraminous backing member comprising a patterned resin layer joined to a first dewatering felt layer.

Referring to FIG. 11, the void volume provided by a cast resin layer 1221 joined to a dewatering felt is obtained by measuring the percent open area of the resin layer 1221 at the plane of surface 1222 and the thickness of the resin layer 1221 above the felt surface 327. The percent open area of a sample at the surface 1222 can be measured by any convenient method. One such method is to take an enlarged photograph (approximately 10 to 40×) of the surface and use a suitable personal computer based image analysis program, such as IMAGE software available from the National Institute of Health, to determine the percent open area of the resin layer 1221 at the plane of surface 1222. The depth of the cast resin can be determined by using a suitable dial indicator depth gauge, such as a model IDC-1012E manufactured by Mitutoyo Corporation and having a measuring head diameter of 0.45 mm and providing a measuring head force of 60 grams.

If the openings 1239 have highly tapered sidewalls, the percent open area can be corrected to account for the taper. For instance, the percent open area measured at the plane of surface 1222 can be averaged with the percent open area measured at the plane of the felt surface 327 to provide an average percent open area.

The void volume of the cast resin layer is then calculated by multiplying the area of the sample by the percent open area, and then multiplying that product by the depth of the cast resin layer. The weight of water that could be contained in that volume is calculated using the nominal value of 1 g/cc. The value is normalized to grams of water per square meter of the sample. The void volume is reported in grams of water per square meter of the sample.

The term "dewatering felt" as used herein refers to a member which is absorbent, compressible, and flexible so that it is deformable to follow the contour of the non-monoplanar intermediate web 120A on the imprinting member 219, and capable of receiving and containing water pressed from an intermediate web 120A. The dewatering felts 320 and 360 can be formed of natural materials, synthetic materials, or combinations thereof. A suitable dewatering felt layer comprises a nonwoven batt of natural or synthetic fibers joined, such as by needling, to a support structure formed of woven filaments. Suitable materials from which the nonwoven batt can be formed include but are not limited to natural fibers such as wool and synthetic fibers such as polyester and nylon. The fibers from which the batt is formed can have a denier of between about 3 and about 40 grams per 9000 meters of filament length. The felt can have a layered construction, and comprise a mixture of fiber types and sizes.

The dewatering felt 320 can have a first surface 325 having a relatively high density, relatively small pore size, and a second surface 327 having a relatively low density, relatively large pore size. Likewise, the second dewatering felt 360 can have a first surface 365 having a relatively high density, relatively small pore size, and a second surface 367 having a relatively low density, relatively large pore size.

The first dewatering felt 320 can have a thickness of between about 2 mm to about 5 mm, a basis weight of about 800 to about 2000 grams per square meter, an average density (basis weight divided by thickness) of between about 0.35 gram per cubic centimeter and about 0.45 gram per cubic centimeter.

Each of the layers 320 and 360 can have an air permeability between about 5 and about 200 scfm (standard cubic feet per minute), more preferably between about 5 and about 100 scfm, and even more preferably between about 20 and about 75 scfm. In one embodiment the first felt layer 320 has an air permeability greater than about 20 scfm and less than about 50 scfm. The air permeability in scfm is a measure of the number of standard cubic feet of air per minute that pass through a one square foot area of the felt layer at a pressure drop across the thickness of the felt of about 0.5 inch of water. The air permeability is measured across the thickness of the felt layer at a pressure difference of 0.5 inch of water, using a Valmet permeability measuring device (Model Wigo Taifun Type 1000 using Orifice #1) available from the Valmet Corp. of Pansio, Finland, or an equivalent device. It will be understood that the air permeability is measured before first use on a paper machine.

The first felt 320 can have a water holding capacity of at least about 150 milligrams of water per square centimeter of surface area, and a small pore capacity of at least about 100 milligrams per square centimeter. The water holding capacity is a measure of the amount of water held in pores having an effective radius between about 5 and about 500 micrometers in a one square centimeter section of the felt. The small pore capacity is a measure of the amount of water that can be contained in relatively small capillary openings in a one square centimeter section of a dewatering felt. By relatively small openings it is meant capillary openings having an effective radius of between about 5 to about 75 micrometers. Such capillary openings are similar in size to those in a wet paper web.

The water holding capacity and small pore capacity of a felt are measured using liquid porosimeter, such as a TRI Autoporosimeter available from TRI/Princeton Inc. of Princeton, N.J. The water holding capacity and small pore capacity are made according to a methodology described in U.S. patent application Ser. No. 08/461,832 "Web Patterning Apparatus Comprising a Felt Layer and a Photosensitive Resin Layer", filed Jun. 5, 1995 in the name of Trokhan et al., which patent application is incorporated herein by reference.

A suitable first dewatering felt 320 is an AmSeam-2, Style 2732 having a 1:1 batt to base ratio (1 pound batt material for every one pound of woven base reinforcing structure) and a 3 over 6 layered batt construction (3 denier fibers over 6 denier fibers, where the 3 denier fibers are adjacent the surface 325 of the felt layer. Such a felt is available from Appleton Mills of Appleton, Wis. and can have an air permeability of about 25 cubic feet per minute per square foot.

The second dewatering felt layer 360 can have properties similar to those of the first dewatering felt layer 320. A suitable second dewatering felt layer 350 is an AmSeam-2, Style 2732 described above.

The dewatering felts 320, and 360 can have a compressibility of between 20 and 80 percent, preferably between 30 and 70 percent, and more preferably between 40 and 60 percent. The "compressibility" as used herein is a measure of the percentage change in thickness of the dewatering felt under a given loading, and the measurement of compressibility is provided in PCT Publication WO/95/17548 published Jun. 29, 1995 in the name of Ampulski, which publication is incorporated herein by reference.

The intermediate web 120A should have a consistency of between about 14 and about 80 percent at the entrance to the compression nip 300. More preferably, the intermediate web 120A has a consistency between about 15 and about 35 percent at the entrance to the nip 300. The papermaking fibers in an intermediate web 120A having such a preferred consistency have relatively few fiber to fiber bonds, and can be relatively easily rearranged and deflected into the deflection conduit portion 230 by the first dewatering felt 320.

The intermediate web 120A is preferably pressed in the compression nip 300 at a nip pressure of at least 100 pounds per square inch (psi), and more preferably at least 200 psi. In a preferred embodiment, the intermediate web 120A is pressed in the compression nip 300 at a nip pressure greater than about 400 pounds per square inch.

The machine direction nip length can be between about 3.0 inches and about 20.0 inches. For a machine direction nip length between 4.0 inches to 10.0 inches, the press assembly 700 is preferably operated to provide between about 400–10000 pounds of force per lineal inch of cross machine direction nip width. The cross machine direction nip width is measured perpendicular to the plane of FIG. 4.

Pressing the web, felt layers, and imprinting member in a nip having a machine direction length of at least about 3.0 inches can improve dewatering of the web. For a given paper machine speed, the relatively long nip length increases the residence time of the web and the felts in the nip. Accordingly, water can be more effectively removed from the web, even at higher machine speeds.

The nip pressure in psi is calculated by dividing the nip force exerted on the web by the area of the nip 300. The force exerted by the nip 300 is controlled by the pressure source P, and can be calculated using various force or pressure transducers familiar to those skilled in the art. The area of nip 300 is measured using a sheet of carbon paper and a sheet of plain white paper.

The carbon paper is placed on the sheet of plain paper. The carbon paper and the sheet of plain paper are placed in the compression nip 300 with the dewatering felts 320, 350, and 360, and the imprinting member 219. The carbon paper is positioned adjacent the first dewatering felt 320 and the plain paper is positioned adjacent the imprinting member 219. The shoe press assembly 700 is then activated to provide the desired press force, and the area of the nip 300 at that level of force is measured from the imprint that the carbon paper imparts to the sheet of plain white paper. Likewise, the machine direction nip length and the cross machine direction nip width can be determined from the imprint that the carbon paper imparts to the sheet of plain white paper.

Figure 6:
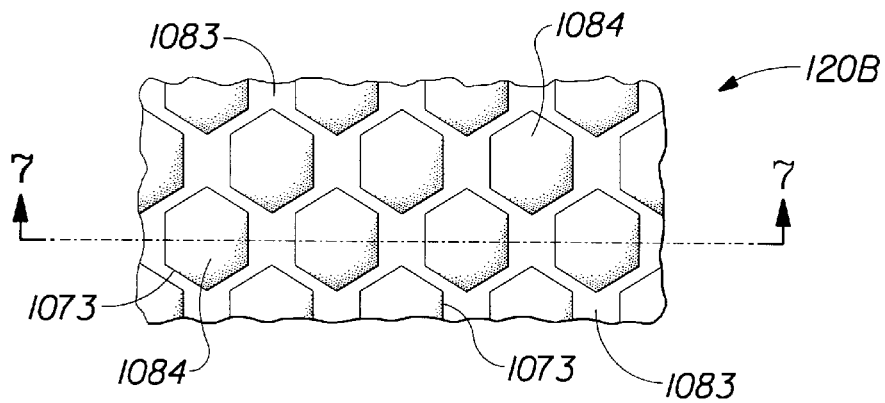
FIG. 6 is a plan view schematic illustration of a paper web.
Figure 7:
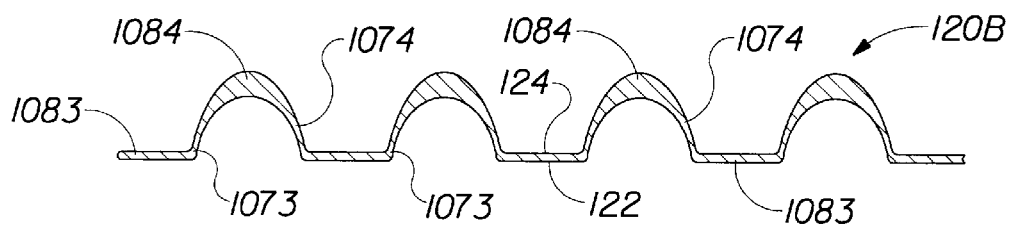
FIG. 7 is a cross-sectional schematic illustration of the paper web taken along lines 7—7 in FIG. 7.
Figure 8:
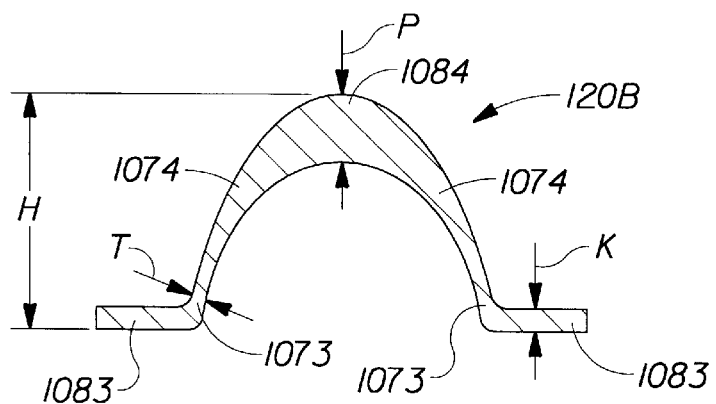
FIG. 8 is enlarged schematic illustration of the paper web of FIG. 7.

The molded web 120B is preferably pressed to have a consistency of at least about 30 percent at the exit of the compression nip 300. Pressing the intermediate web 120A as shown in FIG. 1 molds the web to provide a first relatively high density region 1083 associated with the web imprinting surface 222 and a second relatively low density region 1084 of the web associated with the deflection conduit portion 230. Pressing the intermediate web 120A on an imprinting fabric 219 having a macroscopically monoplanar, patterned, continuous network web imprinting surface 222, as shown in FIGS. 2–4, provides a molded web 120B having a macroscopically monoplanar, patterned, continuous network region 1083 having a relatively high density, and a plurality of discrete, relatively low density domes 1084 dispersed throughout the continuous, relatively high density network region 1083. Such a molded web 120B is shown in FIGS. 6–8. Such a molded web has the advantage that the continuous, relatively high density network region 1083 provides a continuous loadpath for carrying tensile loads.

The molded web 120B can also have a third intermediate density region 1074 extending intermediate the first and second regions 1083 and 1084, as shown in FIG. 7. The third region 1074 comprises a transition region 1073 positioned adjacent the first relatively high density region 1083. The intermediate density region 1074 is formed as the first dewatering felt 320 draws papermaking fibers into the deflection conduit portion 230, and has a tapered, generally trapezoidal cross-section.

The transition region 1073 is formed by compaction of the intermediate web 120A at the perimeter of the deflection conduit portion 230. The region 1073 encloses the intermediate density region 1074 to at least partially encircle each of the relatively low density domes 1084. The transition region 1073 is characterized in having a thickness T which is a local minima, and which is less than the thickness K of the relatively high density region 1083, and a local density which is greater than the density of the relatively high density region 1083. The relatively low density domes 1084 have a thickness P which is a local maxima, and which is greater than the thickness K of the relatively high density, continuous network region 1083. Without being limited by theory, it is believed that the transition region 1073 acts as a hinge which enhances web flexibility. The molded web 120B formed by the process shown in FIG. 1 is characterized in having relatively high tensile strength and flexibility for a given level of web basis weight and web caliper H (FIG. 8).

A sixth step in the practice of the present invention can comprise pre-drying the molded web 120B, such as with a through-air dryer 400 as shown in FIG. 1. The molded web 120B can be pre-dried by directing a drying gas, such as heated air, through the molded web 120B. In one embodiment, the heated air is directed first through the molded web 120B from the first web face 122 to the second web face 124, and subsequently through the deflection conduit portion 230 of the imprinting member 219 on which the molded web is carried. The air directed through the molded web 120B partially dries the molded web 120B. In one embodiment the molded web 120B can have a consistency of between about 30 and about 65 percent upon entering the through air dryer 400, and a consistency of between about 40 and about 80 upon exiting the through air dryer 400.

Referring to FIG. 1, the through air dryer 400 can comprise a hollow rotating drum 410. The molded web 120B can be carried around the hollow drum 410 on the imprinting member 219, and heated air can be directed radially outward from the hollow drum 410 to pass first through the web 120B and then through the imprinting member 219. Alternatively, the heated air can be directed radially inward (not shown). Suitable through air dryers for use in practicing the present invention are disclosed in U.S. Pat. No. 3,303,576 issued May 26, 1965 to Sisson and U.S. Pat. No. 5,274,930 issued Jan. 4, 1994 to Ensign et al., which patents are incorporated herein by reference. Alternatively, one or more through air dryers 400 or other suitable drying devices can be located upstream of the nip 300 to partially dry the web prior to pressing the web in the nip 300.

A seventh step in the practice of the present invention can comprise impressing the web imprinting surface 222 of the foraminous imprinting member 219 into the molded web 120B to form an imprinted web 120C. Impressing the web imprinting surface 222 into the molded web 120B serves to further density the relatively high density region 1083 of the molded web, thereby increasing the difference in density between the regions 1083 and 1084. Referring to FIG. 1, the molded web 120B is carried on the imprinting member 219 and interposed between the imprinting member 219 and an impression surface at a nip 490. The impression surface can comprise a surface 512 of a heated drying drum 510, and the nip 490 can be formed between a roll 209 and the dryer drum 510. The imprinted web 120C can then be adhered to the surface 512 of the dryer drum 510 with the aid of a creping adhesive, and finally dried. The dried, imprinted web 120C can be foreshortened as it is removed from the dryer drum 510, such as by creping the imprinted web 120C from the dryer drum with a doctor blade 524.

The method provided by the present invention is particularly useful for making paper webs having a basis weight of between about 10 grams per square meter to about 65 grams per square meter. Such paper webs are suitable for use in the manufacture of single and multiple ply tissue paper webs for use as facial tissue, toilet tissue, and paper towel products.

An alternative embodiment of the present invention is illustrated in FIGS. 9–12, wherein a web imprinting member 1219 comprises a resin layer joined to a dewatering felt layer, and wherein a foraminous backing member 1350 comprises a resin layer joined to a dewatering felt layer.

Referring to FIG. 11, the backing member 1350 comprises a patterned resin layer 1221 joined to a dewatering felt layer, such as first dewatering felt layer 320 described generally above with reference to FIG. 5. The first dewatering felt layer 320 comprises a nonwoven fibrous batt 1320 joined, such as by needling, to a reinforcing member formed of woven filaments 3620. The batt 1320 has a first sheet side corresponding to the first web facing surface 325, and an oppositely facing second side corresponding to the second surface 327. The portion of the batt 1320 adjacent the first web facing surface 325 has a relatively high density, relatively small pore size compared to the portion of the batt 1320 adjacent the second surface 327.

The patterned resin layer 1221 is joined to the batt 1320 to cover some, but not all of, the second surface 327 of the batt 1320. The resin layer 1221 extends from the second surface 327 as shown in FIG. 11, to have a surface 1222 spaced from the batt 1320. Openings 1239 in the surface 1222 communicate with conduits 1230 in the resin layer 1221. In one embodiment, the resin layer 1221 has a continuous network surface 1222 with discrete, spaced apart openings 1239 of discrete, spaced apart conduits 1230. Alternatively, the resin layer 1221 can comprise a plurality of discrete surfaces 1222 defined by discrete resin protuberances extending from the second surface 327 of the felt layer 320.

The surface 1222 can be continuous, discontinuous, or semicontinuous. In one embodiment, the surface 1222 can be a macroscopically monoplanar, continuous network surface, such as surface 222 shown in FIG. 2. A plurality of discrete, spaced apart openings 1239 in the surface 1222 are in flow communication with the second surface 327 via conduits 1230 which extend through the thickness of the resin layer 1221.

The conduits 1230 can provide a void volume of between about 40 and about 600 grams per square meter, and the openings 1239 in the surface 1222 provide about 20 percent to about 80 percent open area on the surface 1222. The resin layer 1221 can have between about 25 and about 600 openings 1239 per square inch.

The basis weight of the portion of the batt 1320 intermediate the filaments 3620 of the reinforcing member and the surface 325 on the first sheet side of the first felt layer 320 is preferably at least about equal to the basis weight of the portion of the batt intermediate the reinforcing member and the surface 327. In one embodiment, most of the batt 1320 is disposed intermediate the reinforcing member and the surface 325. The total basis weight of the batt 1320 is between about 500 and about 2000 grams per square meter.

Figure 12:
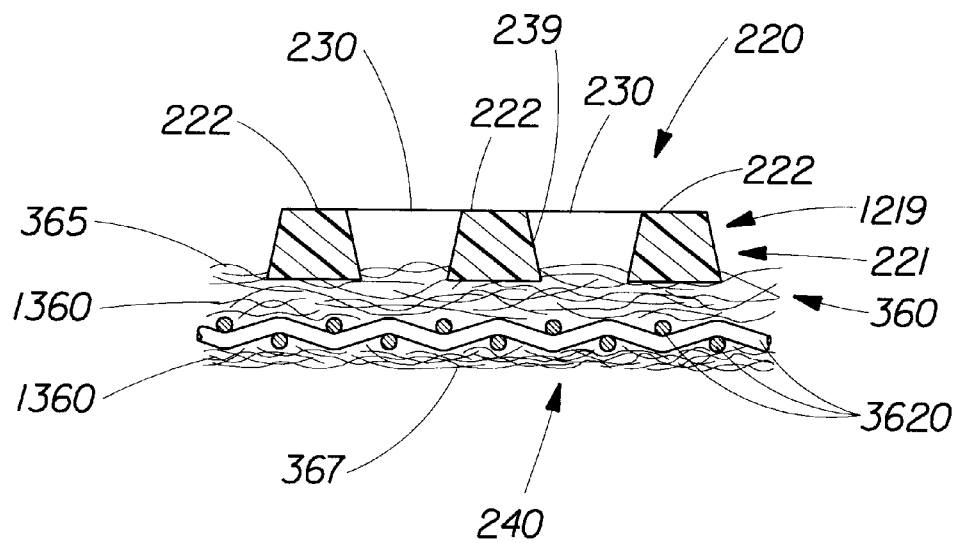
FIG. 12 is a schematic cross-sectional illustration of a composite imprinting member comprising a patterned resin layer joined to a second dewatering felt layer.

Referring to FIG. 12, the composite imprinting member 1219 has a first web contacting face 220 and a second face 240. The composite imprinting member 1219 includes a patterned resin layer 221 joined to a second dewatering felt layer 360, such as the dewatering felt layer 360 described generally above with respect to FIG. 5. The second dewatering felt layer 360 comprises a nonwoven fibrous batt 1360 joined, such as by needling, to a reinforcing member formed of woven filaments 3620. The batt 1360 has a first surface 365 and a second surface 367. The portion of the batt 1360 adjacent the first web facing surface 365 has a relatively high density, relatively small pore size compared to the portion of the batt 1360 adjacent the second surface 367.

The patterned resin layer 221 is joined to the batt 1360 to cover some, but not all of, the first surface 365 of the batt 1360. The resin layer 221 extends from the surface 365 as shown in FIG. 12, to have the web imprinting surface 222 spaced from the batt 1360. The resin layer 221 comprises a conduit portion. In one embodiment, the resin layer 221 has a continuous network web imprinting surface 222 and discrete deflection conduits 230 having openings 239 of the type shown in FIG. 2. Alternatively, the resin layer 221 can comprise a plurality of discrete protuberances extending from the first surface 365 to provide discrete, spaced apart web imprinting surfaces 222.

The following publications and patent applications are incorporated by reference for the purpose of disclosing a web patterning apparatus comprising a patterned resin layer joined to a dewatering felt layer: U.S. Pat. No. 5,556,509 issued Sep. 17, 1996 to Trokhan et al.; PCT publication WO 96/00812 published Jan. 11, 1996 in the name of Trokhan et al.; PCT publication WO 96/25547 published Aug. 22, 1996 in the name of Trokhan; U.S. patent application Ser. No. 08/701,600 filed Aug. 22, 1996 in the names of Ostendorf et al., and U.S. patent application Ser. No. 08/640,452 filed Apr. 30, 1996 in the name of Ampulski et al.

The resin layer 221 in FIG. 12 can have a pattern which is generally the same as, or alternatively, different from, the pattern of the resin layer 1221 shown in FIG. 11. For instance, openings 239 in resin layer 221 can be equal in number, size, and spacing with respect to the openings 1239 in resin layer 1221. Alternatively, the resin layer 221 can have openings 239 which are different in number, size, and/or spacing with respect to the openings 1239.

Figure 9:
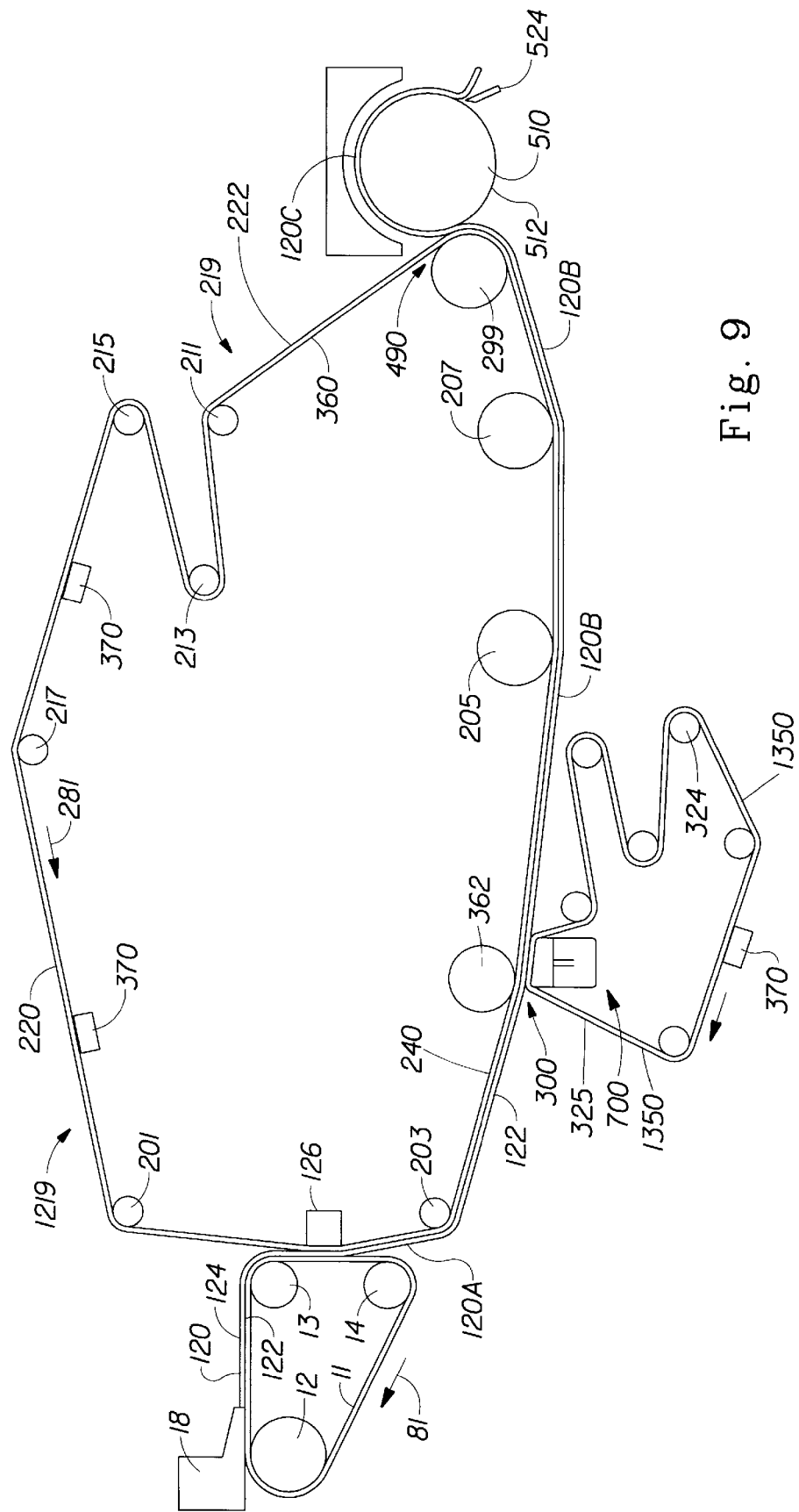
FIG. 9 is a schematic representation of one embodiment of a continuous papermaking machine illustrating transferring a paper web from a foraminous forming member to a composite imprinting member comprising a felt layer, carrying the paper web on the composite imprinting member to a compression nip, positioning a face of the web against a sheet side of a felt layer joined to a foraminous backing member in the nip, and pressing the web in the compression nip.
Figure 10:
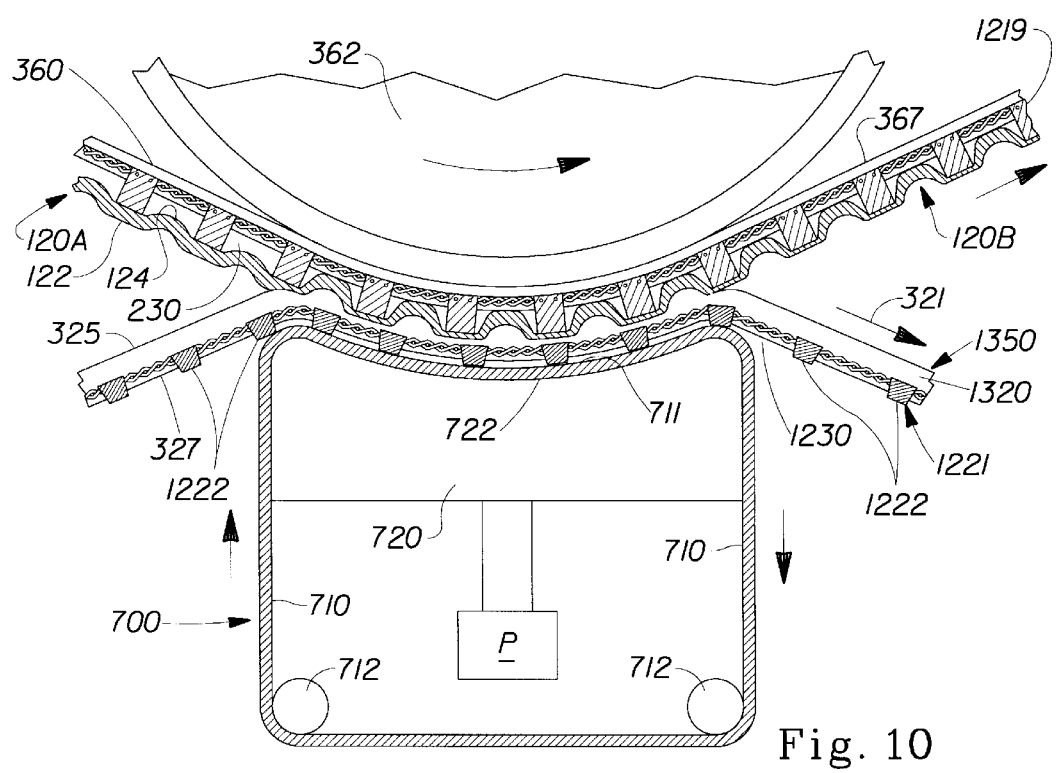
FIG. 10 is an enlarged schematic illustration of the compression nip of FIG. 9 showing a web positioned intermediate a composite imprinting member and a first felt layer in a compression nip, wherein a foraminous backing member comprising a patterned resin layer is joined to the first dewatering felt layer, and wherein the composite imprinting member comprises a patterned resin layer joined to a second dewatering felt layer.

Referring to FIGS. 9 and 10, the embryonic web is transfered from the forming member 11 to the composite imprinting member 1219 with vacuum box 126, such that the surface 124 of the embryonic web is supported on the first face 220 of the imprinting member 1219.

The composite imprinting member 1219 carries the web to the nip 300. Referring the FIG. 10, the web 120A is pressed between the composite imprinting member 1219 and the first felt layer 320 in the nip 300. The surface 122 of the web 120A is positioned against the surface 325 of the felt layer 320. The surface 124 of the web 120A is positioned against the first face 220 of the composite imprinting member 219. The web 120A is pressed in the nip 300 to provide a molded web 120B. The molded web 120B is shown exiting the nip 300 supported on the composite imprinting member 1219 in FIG. 9.

As the web 120A is pressed in the nip 300, water exiting the web 120A can be received by the first felt layer 320 and the second felt layer 360. The water received by the first felt layer 320 can, in turn, exit the batt 1320 through surface 327 to enter the conduits 1230 in the resin layer 1221. The conduits 1230 provide volume for receiving water from the batt 1320, thereby permitting the first felt layer 320 to receive additional water from the web 120A.

After the molded web 120B is formed in the nip 300, the web 120B can be pressed between a roll 299 and a heated Yankee dryer drum 510 to impress the patterned surface 222 of the composite imprinting member 1219 into the web, thereby forming an imprinted web 120C. The imprinted web 120C is dried on the dryer drum 510, and creped from the drum 510 with a docter blade 524.

Figure 13:
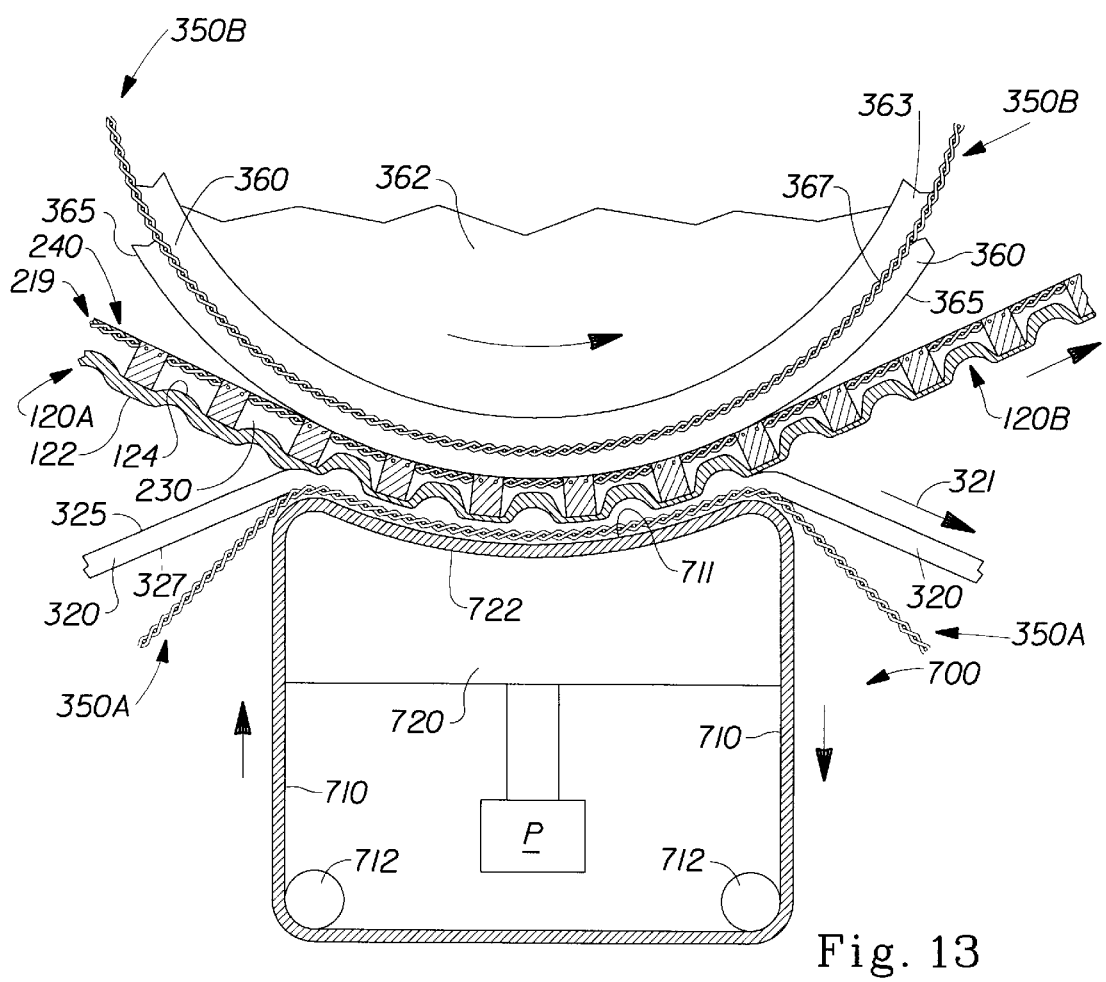
FIG. 13 is an enlarged schematic illustration of an alternative embodiment to that shown in FIG. 5.

FIG. 13 illustrates an alternative embodiment to that shown in FIG. 5. In FIG. 13, two foraminous backing members 350A and 350B are positioned in the compression nip. Foraminous backing member 350A is positioned against the surface 327 of the first felt layer 320. Foraminous backing member 350B is postioned against the surface 367 of the second felt layer 360. The void volume provided by foraminous backing member 350B provides a flow path for water passing through the imprinting member 219 and the second felt layer 360, thereby enhancing dewatering from both sides of the web. The web, imprinting member, felt layers, and two foraminous backing members 350A and 350B are pressed in the compression nip.

Figure 14:
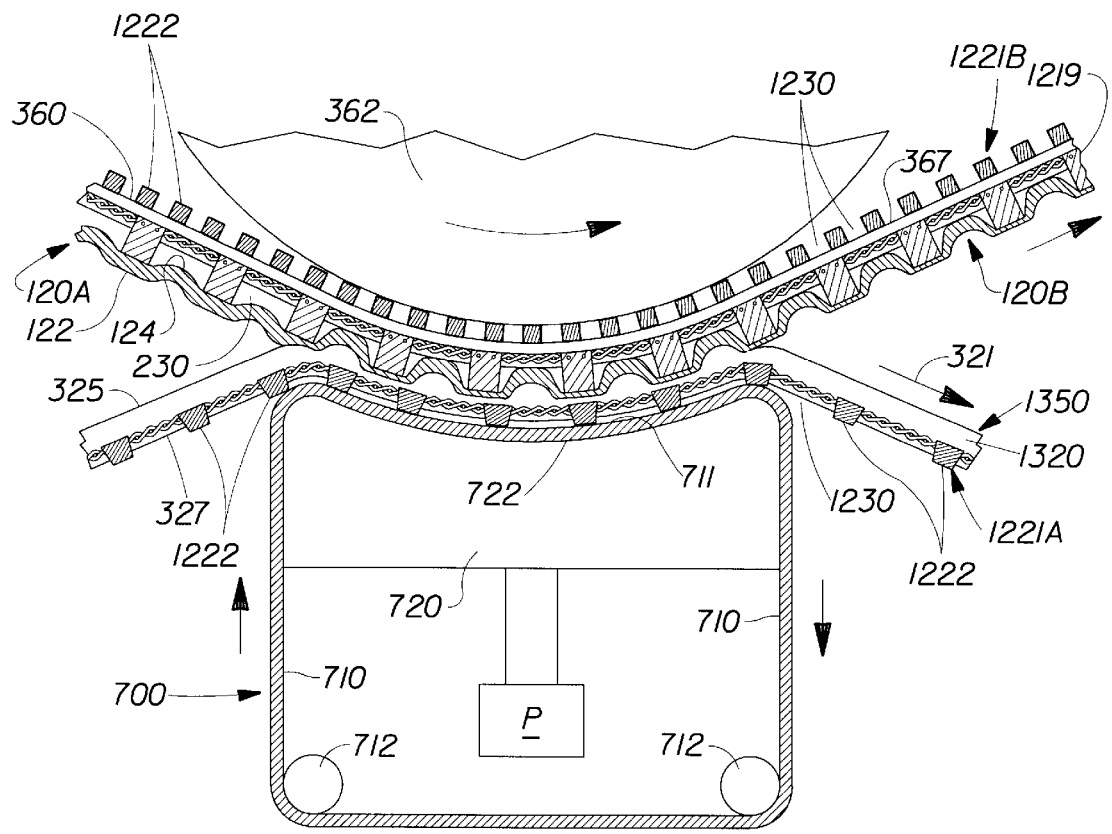
FIG. 14 is an enlarged schematic illustration of an alternative embodiment to that shown in FIG. 10.

FIG. 14 illustrates an alternative embodiment to that shown in FIG. 10. In FIG. 14, a patterned resin layer 1221A is joined to the felt 320 to cover some, but not all of, the second surface 327 of the felt 320. The patterned resin layer 1221A provides void volume adjacent the surface 327. A corresponding patterned resin layer 1221B is joined to the felt 360 to cover some, but not all of, the second surface 367 of the second felt 360. The resin layer 1221B provides void volume adjacent the surface 367.

The arrangement shown in FIG. 14 provides the advantage that that the first felt 320 and the patterned resin layer 1221A are combined in one clothing run, and the second felt 360, the web imprinting resin layer 1219, and the patterned resin layer 1221B are combined in a single clothing run. Accordingly, only two clothing runs are required.

While particular embodiments of the present invention have been illustrated and described, it would be obvious to those skilled in the art that various other changes and modifications can be made without departing from the spirit and scope of the present invention.

We claim:

1. A method of forming a paper web comprising the steps of:

providing an aqueous dispersion of papermaking fibers;

providing a foraminous forming member;

providing a first dewatering felt layer capable of receiving and containing water pressed from a web;

providing a composite imprinting member, the composite imprinting member comprising a foraminous web patterning layer joined to a second dewatering felt layer capable of receiving and containing water pressed from the web, wherein the web patterning layer has a web contacting face comprising a web imprinting surface and a deflection conduit portion, the deflection conduit portion being in flow communication with the second felt dewatering layer;

providing a foraminous backing member;

providing a compression nip between first and second opposed compression surfaces;

forming an embryonic web of the papermaking fibers on the foraminous forming member, the embryonic web having a first face and a second face;

transferring the embryonic web from the foraminous forming member to the composite imprinting member to position the second face of the embryonic web adjacent the web contacting face of the imprinting member;

deflecting a portion of the papermaking fibers in the embryonic web into the deflection conduit portion and removing water from the embryonic web through the deflection conduit portion to form a non-monoplanar intermediate web of the papermaking fibers;

positioning the web and the first dewatering felt layer intermediate the composite imprinting member and the foraminous backing member in the compression nip, wherein the first felt layer is positioned adjacent the first face of the intermediate web, wherein the web imprinting surface of the composite imprinting member is positioned adjacent the second face of the intermediate web, and wherein the first dewatering felt layer is positioned intermediate the web and the foraminous backing member; and pressing the intermediate web in the compression nip to further deflect the papermaking fibers into the deflection conduit portion of the composite imprinting member to form a molded web.

2. The method of claim 1 wherein the composite imprinting member has a web contacting face comprising a macroscopically monoplanar, continuous network web imprinting surface defining a plurality of discrete, isolated deflection conduits.

3. The method of claim 2 wherein the step of providing a foraminous backing member comprises providing a foraminous backing member joined to a dewatering felt layer.

4. The method of claim 3 wherein the step of providing a foraminous backing member comprises providing a foraminous backing member having a patterned resin layer.

5. The method of claim 4 wherein the patterned resin layer of the foraminous backing member comprises a continuous network surface defining a plurality of discrete, isolated conduits.

6. A method of forming a paper web comprising the steps of:

providing an aqueous dispersion of papermaking fibers;

providing a foraminous forming member;

providing a composite imprinting member, the composite imprinting member comprising a foraminous web patterning layer joined to a dewatering felt layer capable of receiving and containing water pressed from the web, wherein the web patterning layer has a web contacting face comprising a web imprinting surface and a deflection conduit portion, the deflection conduit portion being in flow communication with the second felt dewatering layer;

providing a foraminous backing member; the foraminous backing member comprising a patterned resin layer joined to a dewatering felt layer capable of receiving and containing water;

providing a compression nip between first and second opposed compression surfaces;

forming an embryonic web of the papermaking fibers on the foraminous forming member, the embryonic web having a first face and a second face;

transferring the embryonic web from the foraminous forming member to the composite imprinting member to position the second face of the embryonic web adjacent the web contacting face of the imprinting member;

deflecting a portion of the papermaking fibers in the embryonic web into the deflection conduit portion and removing water from the embryonic web through the deflection conduit portion to form a non-monoplanar intermediate web of the papermaking fibers;

positioning the web intermediate the composite imprinting member and the foraminous backing member in the compression nip, wherein the web patterning layer of the composite imprinting member is positioned adjacent the first face of the intermediate web, and wherein the dewatering felt layer of the foraminous backing member is positioned adjacent the second face of the intermediate web; and pressing the intermediate web in the compression nip to further deflect the papermaking fibers into the deflection conduit portion to form a molded web.

* * * * *